US012640602B2

(12) United States Patent
Yamamoto et al.

(10) Patent No.: US 12,640,602 B2
(45) Date of Patent: May 26, 2026

(54) ELECTRIC MOTOR STATOR, ELECTRIC MOTOR, AND METHOD FOR MANUFACTURING ELECTRIC MOTOR STATOR

(71) Applicant: Mitsubishi Electric Corporation, Tokyo (JP)

(72) Inventors: Tatsuya Yamamoto, Tokyo (JP); Yusuke Sakamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 285 days.

(21) Appl. No.: 18/685,928

(22) PCT Filed: Sep. 9, 2021

(86) PCT No.: PCT/JP2021/033192
§ 371 (c)(1),
(2) Date: Feb. 23, 2024

(87) PCT Pub. No.: WO2023/037475
PCT Pub. Date: Mar. 16, 2023

(65) Prior Publication Data
US 2024/0396383 A1 Nov. 28, 2024

(51) Int. Cl.
*H02K 1/14* (2006.01)
*H02K 15/022* (2025.01)
(52) U.S. Cl.
CPC ........... *H02K 1/148* (2013.01); *H02K 15/022* (2013.01)

(58) Field of Classification Search
CPC ............ H02K 1/12; H02K 3/46; H02K 15/02; H02K 1/148
See application file for complete search history.

(56) References Cited

U.S. PATENT DOCUMENTS

| | | | |
|---|---|---|---|
| 2007/0024149 A1 | 2/2007 | Nagata et al. | |
| 2007/0241622 A1 | 10/2007 | Toyoda et al. | |
| 2012/0248928 A1* | 10/2012 | Hashimoto ............ H02K 1/148 | |
| | | | 310/216.009 |
| 2014/0346918 A1 | 11/2014 | Uchitani et al. | |

FOREIGN PATENT DOCUMENTS

| | | | |
|---|---|---|---|
| JP | 2007-006691 A | | 1/2007 |
| JP | 2007325353 A | * | 12/2007 |
| JP | 4062943 B2 | | 3/2008 |

(Continued)

OTHER PUBLICATIONS

JP-2009171673-A Machine Translation (Year: 2009).*

(Continued)

*Primary Examiner* — Oluseye Iwarere
*Assistant Examiner* — Masoud Vaziri
(74) *Attorney, Agent, or Firm* — XSENSUS LLP

(57) ABSTRACT

A stator of an electric motor includes: a stator core including a plurality of joined stator core parts each having a core back portion and a tooth portion; a plurality of insulators covering a plurality of the tooth portions; coils wound around the tooth portions via the insulators; and a plurality of magnetic substances provided between inner peripheral ends of the core back portions and the insulators in such a way as to straddle the core back portions of the stator core parts that are adjacent.

18 Claims, 8 Drawing Sheets

(56)       References Cited

FOREIGN PATENT DOCUMENTS

| JP | 2009171673 | A | * | 7/2009 | |
|----|-----------|---|---|--------|---|
| JP | 4491225 | B2 | | 6/2010 | |
| JP | 2013-066313 | A | | 4/2013 | |
| JP | 5696694 | B2 | | 4/2015 | |
| JP | 2019180214 | A | * | 10/2019 | ............ H02K 1/148 |

OTHER PUBLICATIONS

JP-2019180214-A Machine Translation (Year: 2019).*
JP-2007325353-A Machine Translation (Year: 2007).*
International Search Report and Written Opinion mailed on Nov. 2, 2021, received for International Patent Application No. PCT/JP2021/033192, filed on Sep. 9, 2021, 9 pages including English Translation.

\* cited by examiner

START

↓

S100
PROVIDE INSULATORS ON STATOR CORE PARTS, AND WIND COILS AROUND INSULATORS

↓

S110
ANNULARLY JOIN STATOR CORE PARTS TO FORM STATOR CORE

↓

S120
INSERT MAGNETIC SUBSTANCES INTO MAGNETIC SUBSTANCE INSERTION GROOVES, AND ARRANGE MAGNETIC SUBSTANCES SUCH THAT MAGNETIC SUBSTANCES STRADDLE JOINT PORTIONS OF STATOR CORE PARTS

↓

END

ELECTRIC MOTOR STATOR, ELECTRIC MOTOR, AND METHOD FOR MANUFACTURING ELECTRIC MOTOR STATOR

CROSS-REFERENCE TO RELATED APPLICATION

This application is a national stage application, pursuant to 35 U.S.C. § 371, of International Patent Application No. PCT/JP2021/033192, filed Sep. 9, 2021, the entire contents of which are incorporated herein by reference.

FIELD

The present disclosure relates to: an electric motor stator including a plurality of divided stator cores; an electric motor; and a method for manufacturing the electric motor stator.

BACKGROUND

In a stator of an electric motor having a split stator structure, a plurality of divided stator cores are annularly combined to form a stator core. Such a configuration enables a winding to be easily wound, and improves a winding space factor, leading to improvement of characteristics of an electric motor. However, when a plurality of divided stator cores are annularly combined to form a stator core, misalignment of abutting portions of adjacent stator cores occurs, and deterioration of magnetic characteristics of the stator cores occurs due to stress at the time of abutting. Thus, an increase in cogging torque due to manufacturing variation becomes a problem.

In a stator core of an electric motor disclosed in Patent Literature 1, an annular sleeve which is a magnetic flux path forming member made of a magnetic substance is disposed between a stator and a cylindrical housing made of a non-magnetic substance, so that cogging torque due to manufacturing variation is reduced. The stator includes a plurality of annularly arranged stator pieces each having an arc-shaped yoke portion and a tooth portion.

CITATION LIST

Patent Literature

Patent Literature 1: Japanese Patent No. 4062943

SUMMARY OF INVENTION

Problem to be Solved by the Invention

Miniaturization of an electric motor is required when the electric motor is limited in size or weight. However, in the electric motor of Patent Literature 1, the annular sleeve is disposed outside the stator core. Therefore, the outer diameter of a stator of the electric motor increases. In addition, a structure in which the sleeve is thinned and the plurality of stator pieces is joined has a problem in that rigidity is low both in a radial direction and an axial direction.

The present disclosure has been made in view of the above, and an object of the present disclosure is to obtain an electric motor stator that achieves reduction in cogging torque and improvement in rigidity while achieving miniaturization of an electric motor.

Means to Solve the Problem

To solve the above problems and achieve the objects an electric motor stator of the present disclosure includes: a stator core including a plurality of joined stator core parts each having a core back portion and a tooth portion protruding from the core back portion toward an inner peripheral side; a plurality of insulators covering a plurality of the tooth portions; coils wound around the tooth portions via the insulators; and a plurality of magnetic substances provided between inner peripheral ends of the core back portions and the insulators in such a way as to straddle the core back portions of the stator core parts that are adjacent.

Effects of the Invention

The electric motor stator of the present disclosure has the effect of: reducing cogging torque due to manufacturing variation; and reducing vibration and noise by improvement in rigidity while avoiding an increase in the outer diameter of an electric motor.

DESCRIPTION OF EMBODIMENTS

Hereinafter, an electric motor stator, an electric motor, and a method for manufacturing the electric motor stator according to each embodiment will be described in detail with reference to the drawings.

First Embodiment

Figure 1:
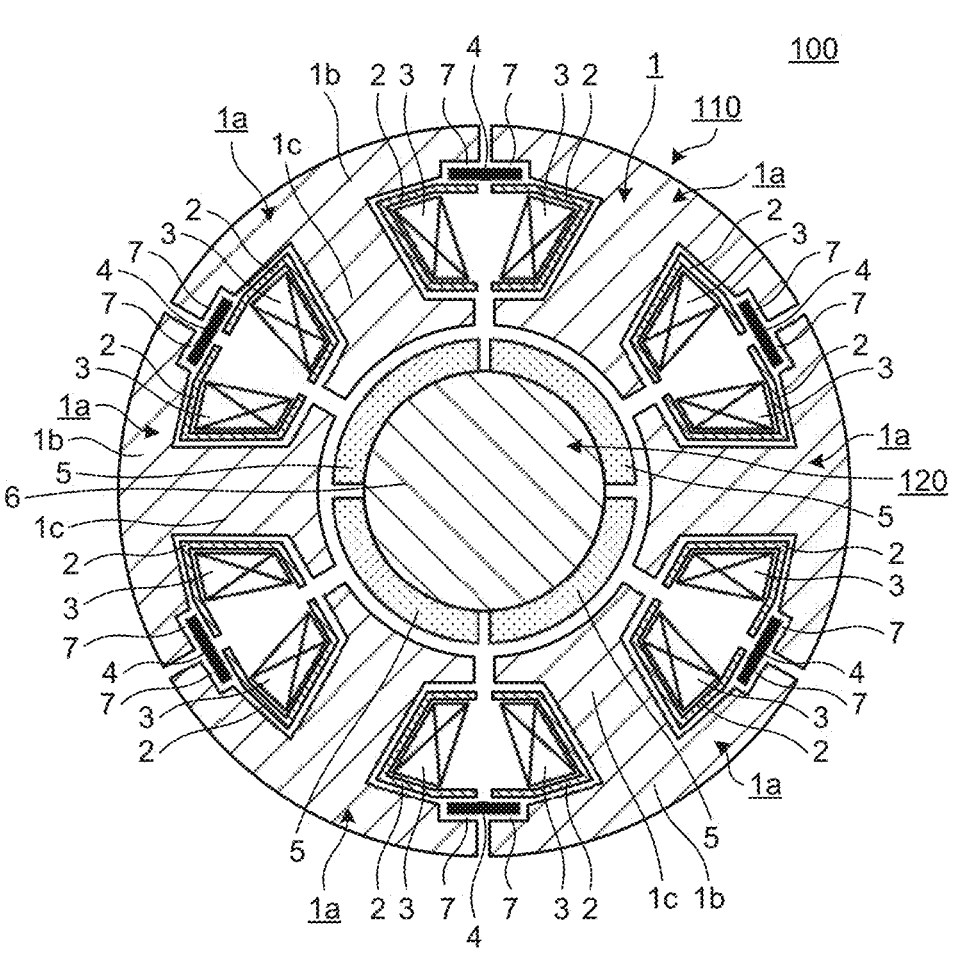
FIG. 1 is a cross-sectional view of an electric motor of a first embodiment, in which a configuration of the electric motor is illustrated.
Figure 2:
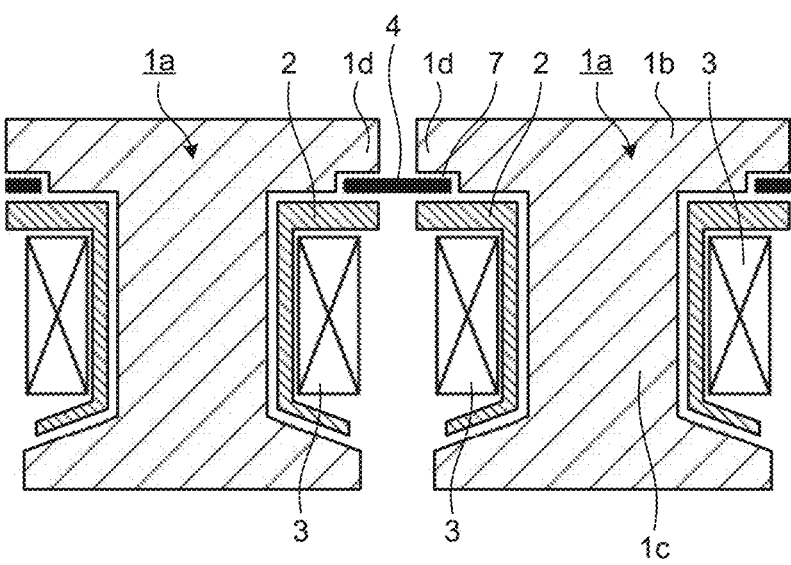
FIG. 2 is a developed cross-sectional view of a part of the electric motor of the first embodiment illustrated in FIG. 1, in which the part of the electric motor is developed in a linear state.

FIG. 1 is a cross-sectional view of an electric motor of a first embodiment, in which a configuration of the electric motor is illustrated. FIG. 1 is a cross-sectional view taken along a direction orthogonal to an axial direction of a central axis of the electric motor. FIG. 2 is a developed cross-sectional view of a part of the electric motor of the first embodiment illustrated in FIG. 1, in which the part of the electric motor is developed in a linear state. An electric motor 100 illustrated in FIG. 1 includes a stator 110 and a rotor 120 provided on an inner side of the stator 110.

The stator 110 includes a stator core 1, insulators 2, coils (windings) 3, and magnetic substances 4. The stator core 1 has a split stator structure. A plurality of stator core parts 1a divided in a circumferential direction is annularly combined to form the stator core 1. FIG. 2 illustrates two adjacent stator core parts 1a.

Each of the stator core parts 1a includes: a core back portion 1b forming a cylindrical shape as a result of the plurality of stator core parts 1a are annularly combined; and a tooth portion 1c protruding from an inner peripheral surface of the core back portion 1b. As a result of the plurality of stator core parts 1a are annularly combined, the tooth portions 1c are radially arranged. Each stator core part 1a includes a plurality of magnetic steel sheets laminated together along the axial direction. The stator core part 1a may be made of soft magnetic composite materials (SMCs) that are soft magnetic substances.

The insulator 2 electrically insulates the stator core 1 from the coil 3. The insulator 2 has a function of end treatment of the coil 3. The tooth portion 1c is covered with the insulator 2 around which the coil 3 is wound.

The rotor 120 includes: a shaft 6 as a rotating shaft made of a magnetic substance; and a plurality of magnets 5 arranged around the shaft 6. The magnets 5 may be fixed to the shaft 6 by magnetic force, or may be fixed by a fixing member such as an adhesive. As a result of fixing the magnets 5 by a separate fixing member, it is possible to prevent the magnets 5 from, for example, flying due to centrifugal force applied to the magnets 5 when the rotor 120 rotates.

The electric motor 100 of the first embodiment is a 4-pole, 6-slot electric motor including four magnets 5 and six stator core parts 1a on an outer periphery of the shaft 6.

In the first embodiment, each of a plurality of the magnetic substances 4 is disposed in the stator 110 in such a way as to straddle joint portions 1d (see FIG. 2) for joining the core back portions 1b of the adjacent stator core parts 1a. The magnetic substance 4 has a rectangular or arc-shaped cross section, and extends in a direction of the central axis of the electric motor 100. In the first embodiment, a magnetic substance insertion groove 7 is provided in each of corners of the core back portion 1b of each stator core part 1a, on both outer sides in the circumferential direction and on the inner peripheral side of the core back portion 1b. When the plurality of stator core parts 1a is annularly arranged, the magnetic substances 4 are inserted into the magnetic substance insertion grooves 7 surrounded by the core back portions 1b and ends of the insulators 2. Each magnetic substance 4 is inserted in such a way as to be in contact with the adjacent stator core parts 1a. That is, each magnetic substance 4 is pressed toward an outer peripheral side of the stator core 1 by the insulators 2. As a means for annularly fixing the plurality of stator core parts 1a, iron may be melted by welding or the like. Alternatively, a resin such as an adhesive may be applied to outer peripheries and joint surfaces to join the stator core parts 1a.

A magnetic substance including a thin magnetic steel sheet may be used as the magnetic substance 4. Alternatively, a massive magnetic substance may be used as the magnetic substance 4. A magnetic material having a magnetic permeability higher than the magnetic permeability of air is used as the magnetic substance 4. In the circumferential direction, a length of the magnetic substance insertion groove 7 on one side of the stator core part 1a is longer than half a length of the magnetic substance 4 so that the magnetic substance 4 can be inserted.

Figure 3:
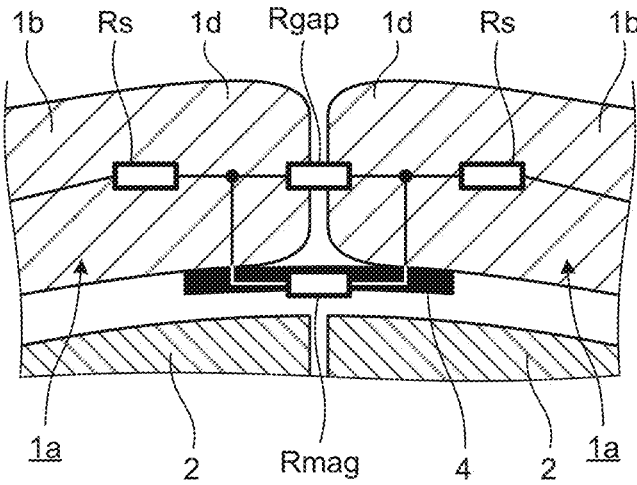
FIG. 3 is a diagram illustrating a magnetic equivalent circuit of a stator core with magnetic substances disposed therein in the electric motor of the first embodiment.

FIG. 3 is a diagram illustrating a magnetic equivalent circuit of the stator core 1 with the magnetic substances 4 disposed therein in the electric motor 100 of the first embodiment. FIG. 3 is a conceptual diagram illustrating the vicinity of the joint portions 1d of the core back portions 1b of the stator core parts 1a illustrated in FIGS. 1 and 2. Here, Rs denotes the magnetic resistance of the core back portion 1b of the stator core part 1a, and Rgap denotes the magnetic resistance of an air gap between the adjacent stator core parts 1a. When no magnetic substance 4 exists, a magnetic resistance Rm of the joint portions (abutting portions) 1d of the adjacent stator core parts 1a is expressed as follows:

$$Rm=2Rs+Rgap.$$

When the magnetic substance 4 is disposed, a magnetic resistance Rm' of the joint portions (abutting portions) 1d of the adjacent stator core parts 1a is expressed as follows:

$$Rm'=2Rs+(Rgap \times Rmag)/(Rgap+Rmag),$$

where Rmag is the magnetic resistance of the magnetic substance 4.

That is, when the magnetic substance 4 is disposed, a magnetic circuit is disposed which has the magnetic resistance Rmag in parallel with a magnetic resistance generated in the joint portions 1d of the adjacent stator core parts 1a. Thus, it is possible to reduce the magnetic resistance of the joint portions 1d of the adjacent stator core parts 1a. As a result of formation of such a magnetic circuit, magnetic flux generated from the magnet 5 of the rotor 120 passes through the magnetic substance 4 when passing through the joint portions 1d of the adjacent stator core parts 1a while passing through the stator core 1.

Thus, the magnetic substance 4 forming the magnetic circuit parallel to the joint portions 1d of the stator core parts 1a is disposed as described above. Therefore, even if manufacturing variation occurs due to misalignment of the joint portions or deterioration of magnetic characteristics of the iron core caused by punching or the like, it is possible to reduce fluctuation (variation) of the magnetic resistance of the joint portions 1d and suppress an increase in cogging torque. In addition, since the magnetic substance insertion grooves 7 are provided in the stator core 1, it is possible to dispose the magnetic substances 4 without changing the areas of winding portions of the insulators 2 for winding the coils 3. Furthermore, since the magnetic resistance itself of the joint portion 1d can be reduced, the torque or output of the electric motor 100 is improved.

In addition, since the magnetic substance 4 is inserted in such a way as to straddle the joint portions 1d, it is possible to reinforce, from an inner diameter side, the annular shape which is in an unbalanced state due to variations in positioning and the like, and to improve overall rigidity. In addition, since the magnetic substances 4 connected in the axial direction are inserted into the stator core 1 including the magnetic steel sheets laminated together in the axial direction, it is possible to increase the rigidity of the stator core 1 in the axial direction. This serves as countermeasures against vibration and noise of the electric motor 100.

Figure 4:
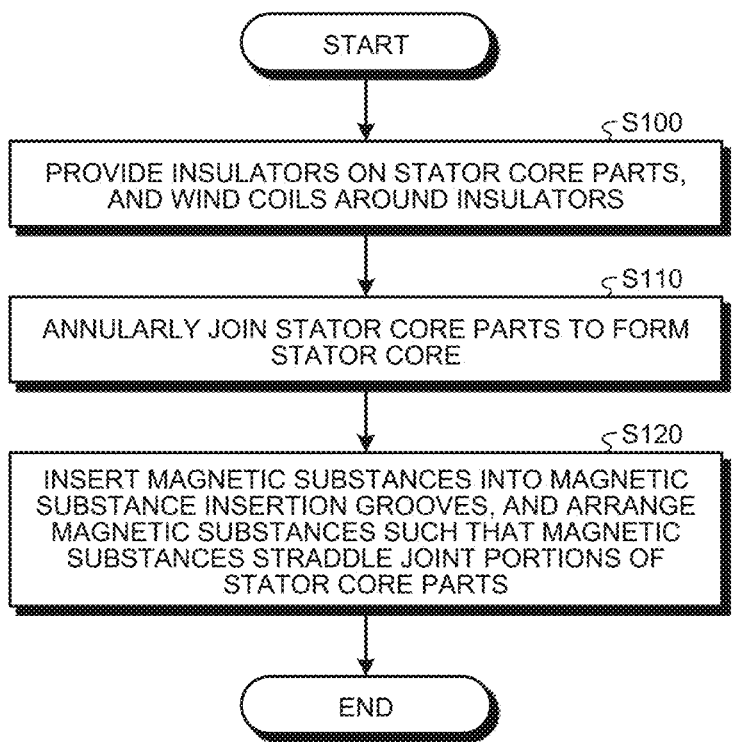
FIG. 4 is a process chart illustrating a process of manufacturing the electric motor of the first embodiment.

Next, an example of a method for manufacturing the electric motor 100 will be described. FIG. 4 is a process chart illustrating a process of manufacturing the electric motor 100 of the first embodiment. First, the insulator 2 is provided on each stator core part 1a, and the coil 3 is wound around the insulator 2 (step S100). Next, the stator core parts 1a around which the coils 3 have been wound are annularly joined, as illustrated in FIG. 1, to form the stator core 1 (step S110). Next, the magnetic substances 4 are inserted into the magnetic substance insertion grooves 7, which have been formed by being surrounded by the core back portions 1b and the ends of the insulators 2 as a result of the stator core parts 1a being joined to each other, in such a way as to straddle the joint portions 1d (step S120). Each magnetic substance 4 is inserted in such a way as to be in contact with the adjacent stator core parts 1a.

According to such a manufacturing method, the magnetic substances 4 are inserted into the magnetic substance insertion grooves 7 in a state where the stator core 1, the insulators 2, and the coils 3 have been assembled. Therefore, the magnetic substances 4 can be easily arranged and fixed.

As described above, according to the first embodiment, the magnetic substance insertion groove 7 is provided on the inner peripheral side of the core back portion 1b, and the magnetic substance 4 is inserted into the magnetic substance insertion groove 7 in such a way as to straddle the joint portions 1d for joining the core back portions 1b. Therefore, according to the first embodiment, it is possible to reduce: cogging torque due to manufacturing variation; and vibration and noise by improvement in rigidity, while avoiding an increase in the outer diameter of the electric motor 100. In addition, an increase in cogging torque can be effectively suppressed, because the magnetic substance 4 is disposed on the inner peripheral side of the core back portion 1b, which is a side closer to the coil 3 where the magnetic flux concentrates.

Second Embodiment

Figure 5:
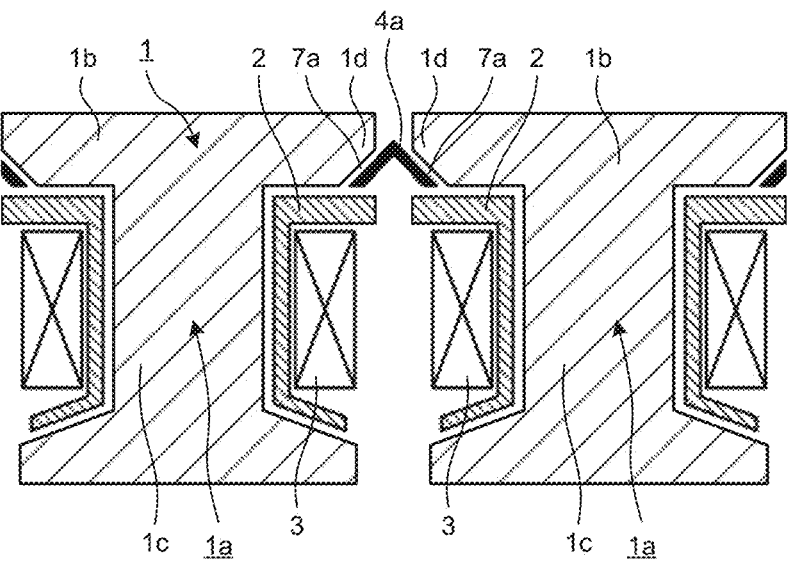
FIG. 5 is a developed cross-sectional view of a part of a stator in an electric motor of a second embodiment, in which the part of the stator is developed in a linear state.

FIG. 5 is a developed cross-sectional view of a part of a stator developed in a linear state in an electric motor of a second embodiment. FIG. 5 illustrates two adjacent stator core parts 1a. In the second embodiment, a magnetic substance insertion groove 7a is provided in a corner on the inner peripheral side of the joint portion 1d of the stator core part 1a, and a magnetic substance 4a is disposed in the magnetic substance insertion groove 7a. The magnetic substance 4a is a bent V-shaped magnetic substance protruding toward an outer periphery. That is, similarly to the first embodiment, also in the second embodiment, the V-shaped magnetic substances 4a are each disposed in the stator core 1 of the stator in such a way as to straddle the joint portions 1d for joining the core back portions 1b of the adjacent stator core parts 1a. The other constituent elements in FIG. 5 have the same configurations and the same functions as those of the constituent elements in FIG. 1, and redundant description will be omitted. The V-shaped magnetic substance 4a is formed by the bending of a plate-like magnetic substance, for example. The magnetic substance insertion groove 7a may be provided in both the stator core part 1a and the insulator 2.

As described above, in the second embodiment, since the V-shaped magnetic substances 4a are provided on the joint portions 1d of the stator core parts 1a, the following effects are obtained in addition to the effects of the first embodiment. That is, the area of the joint portion 1d facing the magnetic substance 4a increases to reduce magnetic resistance, so that an increase in cogging torque due to manufacturing variation can be further suppressed. In addition, since the elasticity of the V-shaped magnetic substance 4a generates force that acts to stretch the stator core 1 in the circumferential direction, the core back portions 1b of the stator core 1 come into contact with each other more firmly, so that the rigidity of the stator core 1 can be improved. This serves as countermeasures against vibration and noise.

Note that although the stator cores 1 of the first and second embodiments each have a completely divided structure, the stator core 1 having a partially connected structure also achieves the same effects as the effects of the first and second embodiments as long as there is a magnetic joint portion between the tooth portions 1c.

In the first and second embodiments, the divided stator core 1 is fixed by welding or bonding. However, a thin annular sleeve may be disposed outside the stator core 1.

Third Embodiment

Figure 6:
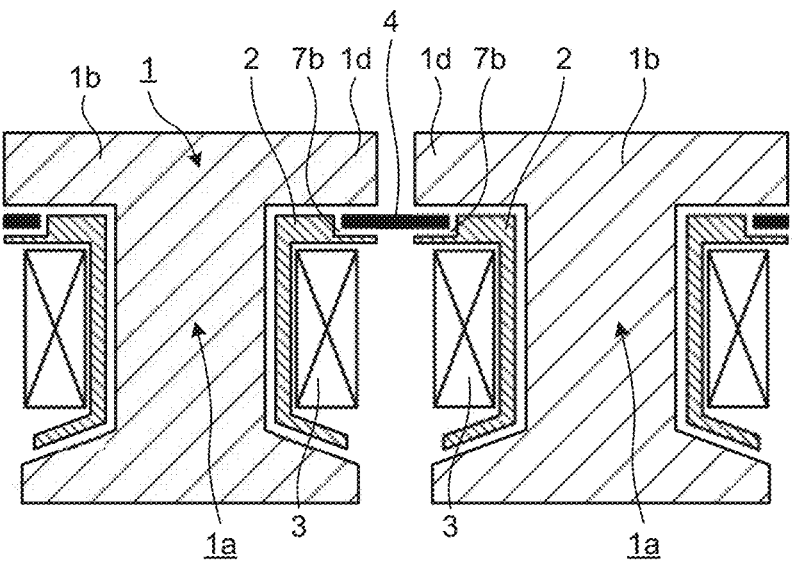
FIG. 6 is a developed cross-sectional view of a part of a stator in an electric motor of a third embodiment, in which the part of the stator is developed in a linear state.

FIG. 6 is a developed cross-sectional view of a part of a stator in an electric motor of a third embodiment, in which the part of the stator is developed in a linear state. FIG. 6 illustrates two adjacent stator core parts 1a. In the third embodiment, a magnetic substance insertion groove 7b for disposing the magnetic substance 4 which is a tabular magnetic substance is provided in an end of the insulator 2 on the core back portion 1b side. When a plurality of the stator core parts 1a are annularly arranged, the tabular magnetic substances 4 are inserted into the magnetic substance insertion grooves 7b surrounded by the core back portions 1b and the insulators 2, in such a way as to straddle the joint portions 1d of the core back portions 1b of the adjacent stator core parts 1a.

As described above, since the magnetic substance insertion grooves 7b are provided in the insulators 2, the area of a joint surface of each joint portion 1d of the stator core parts 1a can be increased. As a result, the joint strength and rigidity of the stator core parts 1a are improved in the third embodiment. In addition, since no magnetic substance insertion groove is provided in the stator core 1, the number of corners of the stator core 1 is reduced, so that punching is facilitated. Furthermore, since the magnetic substances 4 connected in the axial direction are inserted into the stator core 1 including the magnetic steel sheets laminated together in the axial direction, it is possible to increase the rigidity of the stator core 1 in the axial direction. This serves as countermeasures against vibration and noise of the electric motor.

Fourth Embodiment

Figure 7:
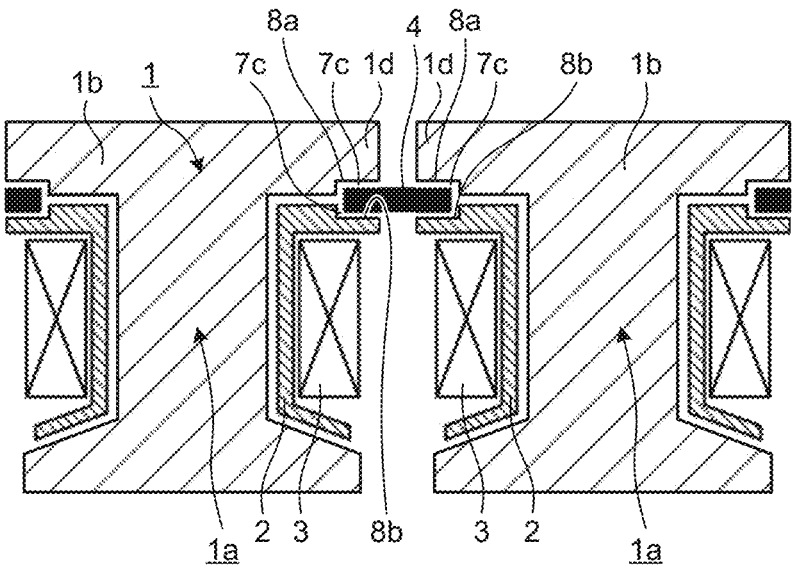
FIG. 7 is a developed cross-sectional view of a part of a stator in an electric motor of a fourth embodiment, in which the part of the stator is developed in a linear state.

FIG. 7 is a developed cross-sectional view of a part of a stator in an electric motor of a fourth embodiment, in which the part of the stator is developed in a linear state. FIG. 7 illustrates two adjacent stator core parts 1a. In the fourth embodiment, in order to form a magnetic substance insertion groove 7c for disposing the magnetic substance 4, a recess 8a is provided in a corner on the inner peripheral side of the joint portion 1d of the core back portion 1b of the stator core part 1a, and a recess 8b is provided in the end of the insulator 2 on the core back portion 1b side. The magnetic substance 4 which is a tabular magnetic substance is disposed in the magnetic substance insertion groove 7c formed by the recesses 8a and 8b.

As described above, the recesses 8a and 8b for forming the magnetic substance insertion groove 7c are provided in the stator core 1 and the insulator 2, respectively, in the fourth embodiment. Therefore, the thickness and volume of the magnetic substance 4 can be increased, leading to an increase in the amount of magnetic flux passing through the magnetic substance 4. This suppresses an increase in cogging torque due to manufacturing variation. Furthermore, the magnetic substance insertion groove 7c is widened to facilitate the insertion of the magnetic substance 4. Moreover, since the magnetic substance 4 is inserted in a state where the width of the stator core 1 is kept large, the rigidity of the stator core 1 is improved. Furthermore, since the magnetic substances 4 connected in the axial direction are inserted into the stator core 1 including the magnetic steel sheets laminated together in the axial direction, it is possible to increase the rigidity of the stator core 1 in the axial direction. This serves as countermeasures against vibration and noise of the electric motor.

Fifth Embodiment

Figure 8:
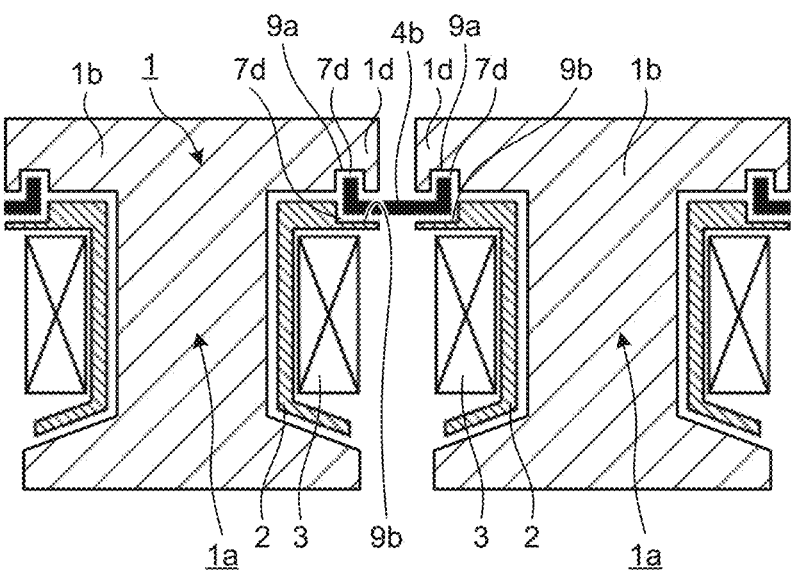
FIG. 8 is a developed cross-sectional view of a part of a stator in an electric motor of a fifth embodiment, in which the part of the stator is developed in a linear state.

FIG. 8 is a developed cross-sectional view of a part of a stator in an electric motor of a fifth embodiment, in which the part of the stator is developed in a linear state. FIG. 8 illustrates two adjacent stator core parts 1a. A magnetic substance 4b in a box shape is used in the fifth embodiment. Both ends of the magnetic substance 4b are bent portions bent toward the outer periphery. In addition, in order to form a magnetic substance insertion groove 7d for disposing the magnetic substance 4b, a recess 9a is provided on the inner peripheral side of the joint portion 1d of the core back portion 1b of the stator core part 1a, and a recess 9b is provided in the end of the insulator 2 on the core back portion 1b side. The magnetic substance 4b in a box shape with the bent portions at both ends is disposed in the magnetic substance insertion groove 7d formed by the recesses 9a and 9b. Note that a recess for forming the magnetic substance insertion groove 7d may be provided only in the stator core 1.

As described above, since the magnetic substance 4b in a box shape is disposed between the adjacent stator core parts 1a, the adjacent stator core parts 1a can be firmly fixed in the fifth embodiment. In addition, the protrusions and recess of the magnetic substance 4b in a box shape can also increase the area of a magnetic circuit. As a result, it is possible to suppress an increase in cogging torque and to improve torque and output. In order to form the magnetic substance 4b in a box shape, a tabular magnetic substance may be bent. Alternatively, a plurality of plate-like magnetic substances may be stacked.

Sixth Embodiment

Figure 9:
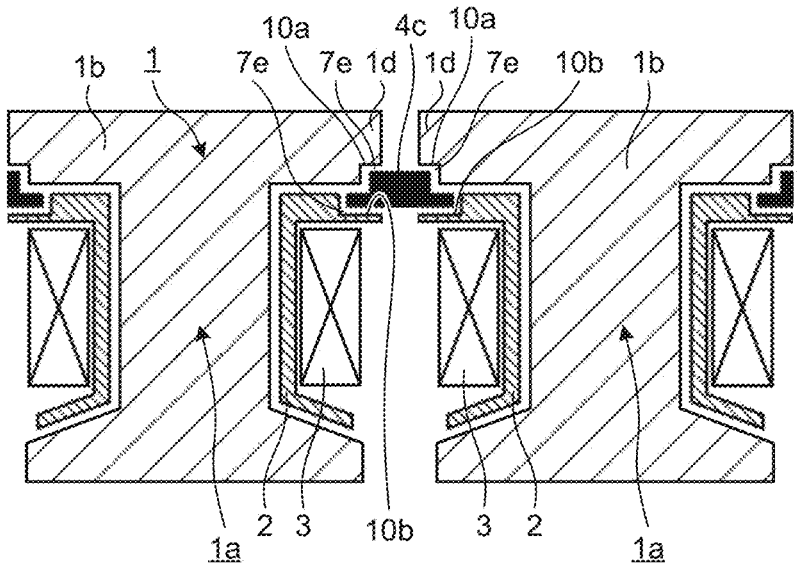
FIG. 9 is a developed cross-sectional view of a part of a stator in an electric motor of a sixth embodiment, in which the part of the stator is developed in a linear state.

FIG. 9 is a developed cross-sectional view of a part of a stator in an electric motor of a sixth embodiment, in which the part of the stator is developed in a linear state. FIG. 9 illustrates two adjacent stator core parts 1a. A magnetic substance 4c in a hat shape is used in the sixth embodiment. A central portion of the magnetic substance 4c protrudes toward the outer periphery. In addition, in order to form a magnetic substance insertion groove 7e for disposing the magnetic substance 4c, a recess 10a is provided on the inner peripheral side of the joint portion 1d of the core back portion 1b of the stator core part 1a, and a recess 10b is provided in the end of the insulator 2 on the core back portion 1b side. The magnetic substance 4c having a protruding shape is disposed in the magnetic substance insertion groove 7e formed by the recesses 10a and 10b. Note that a recess for forming the magnetic substance insertion groove 7e may be provided only in the stator core 1.

As described above, since the magnetic substance 4c having a protruding shape with the protruding central portion is disposed between the adjacent stator core parts 1a, the area of the magnetic substance 4c facing the joint portions 1d of the adjacent stator core parts 1a increases in the sixth embodiment. Therefore, magnetic resistance is reduced. Thus, it is possible to suppress an increase in cogging torque due to manufacturing variation, and to improve torque and output. A plurality of plate-like magnetic substances may be stacked to form the magnetic substance 4c in a protruding shape.

Furthermore, in the first to sixth embodiments, the insulator 2 may have elasticity to cause the magnetic substances 4, 4a, 4b, and 4c to be pressed against the core back portion 1b, so as to improve the rigidity of the stator core 1 and reduce vibration and noise.

Seventh Embodiment

Figure 10:
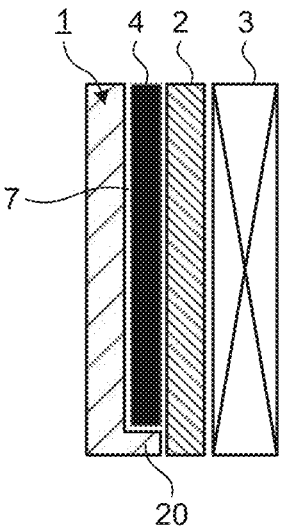
FIG. 10 is a cross-sectional view of an electric motor of a seventh embodiment, in which a configuration of the electric motor is illustrated.

FIG. 10 is a cross-sectional view of an electric motor of a seventh embodiment, in which a configuration of the electric motor is illustrated. FIG. 10 is a cross-sectional view taken along the axial direction of the central axis of the electric motor. Similarly to the first embodiment, the electric motor of the seventh embodiment includes: the stator core 1 in which the magnetic substance insertion grooves 7 have been formed; the magnetic substances 4; the insulators 2; and the coils 3. In the seventh embodiment, magnetic substance stoppers 20 protruding toward the inner peripheral side are provided at a lower end of the stator core 1 in the direction of the central axis so that the magnetic substance stoppers 20 prevent the magnetic substances 4 inserted in the direction of the central axis of the electric motor from falling. Each magnetic substance stopper 20 may be formed such that no magnetic substance insertion groove 7 is provided in one of the plurality of magnetic steel sheets laminated together, located at the lower end of the stator core 1.

As described above, according to the seventh embodiment, the magnetic substance 4 inserted into the magnetic substance insertion groove 7 does not fall in the direction of the central axis of the electric motor, and is positionally fixed. Therefore, manufacturing of the stator is facilitated.

Eighth Embodiment

Figure 11:
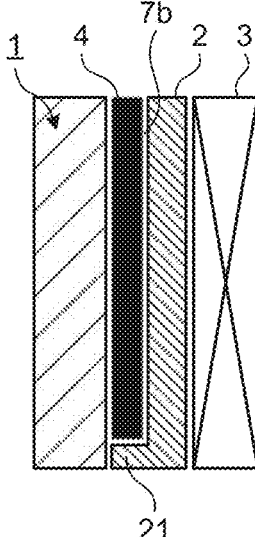
FIG. 11 is a cross-sectional view of an electric motor of an eighth embodiment, in which a configuration of the electric motor is illustrated.

FIG. 11 is a cross-sectional view of an electric motor of an eighth embodiment, in which a configuration of the electric motor is illustrated. FIG. 11 is a cross-sectional view taken along the axial direction of the central axis of the electric motor. Similarly to the third embodiment, the electric motor of the eighth embodiment includes: the stator core 1; the magnetic substances 4 in which the magnetic substance insertion grooves 7b have been formed; the insulators 2; and the coils 3. In the eighth embodiment, a magnetic substance stopper 21 protruding toward the outer peripheral side is provided at a lower end of each insulator 2 in the direction of the central axis so that the magnetic substance stopper 21 prevents the magnetic substance 4 inserted in the direction of the central axis of the electric motor from falling.

As described above, according to the eighth embodiment, the magnetic substance 4 inserted into the magnetic substance insertion groove 7b does not fall in the direction of the central axis of the electric motor, and is positionally fixed. Therefore, manufacturing of the stator is facilitated.

Ninth Embodiment

Figure 12:
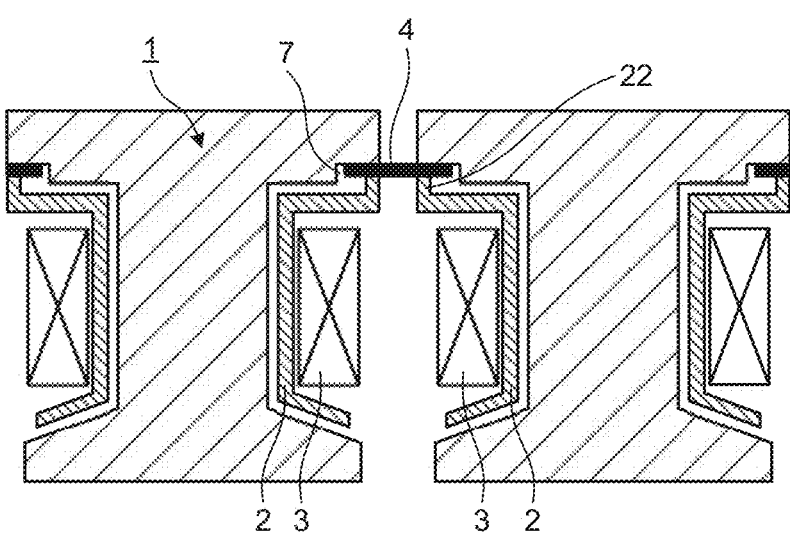
FIG. 12 is a developed cross-sectional view of a part of a stator in an electric motor of a ninth embodiment, in which the part of the stator is developed in a linear state.

FIG. 12 is a developed cross-sectional view of a part of a stator in an electric motor of a ninth embodiment, in which the part of the stator is developed in a linear state. FIG. 12 illustrates two adjacent stator core parts. In the ninth embodiment, a magnetic substance pressing portion 22 that presses the magnetic substance 4 is provided at the end of each insulator 2 of the electric motor 100 of the first embodiment illustrated in FIG. 2. An end of the insulator 2 on a side on which the insulator 2 is in contact with the magnetic substance 4 is bent toward the outer periphery, and serves as the magnetic substance pressing portion 22. Note that the configuration of the magnetic substance pressing portion 22 of the ninth embodiment may also be applied when a magnetic substance insertion groove for inserting the magnetic substance 4 is formed in the insulator 2 or when a magnetic substance insertion groove for inserting the magnetic substance 4 is formed in both the stator core 1 and the insulator 2.

As described above, according to the ninth embodiment, each insulator 2 is provided with the magnetic substance pressing portion 22. As a result, an air gap between each magnetic substance 4 and the stator core 1 is reduced, and magnetic resistance is reduced. This improves the effect of suppressing an increase in cogging torque due to manufacturing variation. In addition, since the magnetic substances 4 are positionally fixed in the magnetic substance insertion grooves 7, manufacturing is facilitated, and rigidity is also improved.

Tenth Embodiment

Figure 13:
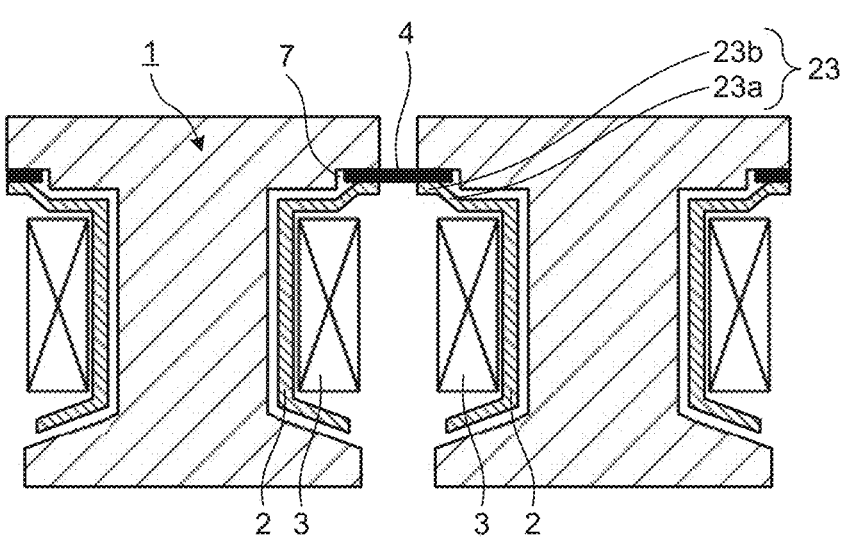
FIG. 13 is a developed cross-sectional view of a part of a stator in an electric motor of a tenth embodiment, in which the part of the stator is developed in a linear state.

FIG. 13 is a developed cross-sectional view of a part of a stator in an electric motor of a tenth embodiment, in which the part of the stator is developed in a linear state. FIG. 13 illustrates two adjacent stator core parts. In the tenth embodiment, a leaf spring 23 is provided at the end of each insulator 2 of the electric motor 100 of the first embodiment illustrated in FIG. 2. The leaf spring 23 includes: an elastic portion 23a having elasticity; and a magnetic substance pressing portion 23b that abuts on the magnetic substance 4. The leaf spring 23 is provided at an end of the insulator 2 on a side on which the insulator 2 is in contact with the magnetic substance 4, and presses the magnetic substance 4 toward the core back portion 1b by elasticity. Note that the configuration of the leaf spring 23 of the tenth embodiment may also be applied when a magnetic substance insertion groove for inserting the magnetic substance 4 is formed in the insulator 2 or when a magnetic substance insertion groove for inserting the magnetic substance 4 is formed in both the stator core 1 and the insulator 2.

As described above, according to the tenth embodiment, since the leaf spring 23 is provided at the end of each insulator 2, each magnetic substance 4 can be easily inserted into the magnetic substance insertion groove 7. Furthermore, the magnetic substances 4 are positionally fixed in the magnetic substance insertion grooves 7, and are pressed against the stator core 1 to reduce air gaps. As a result, magnetic resistance is reduced to improve the effect of suppressing an increase in cogging torque due to manufacturing variation.

Eleventh Embodiment

Figure 14:
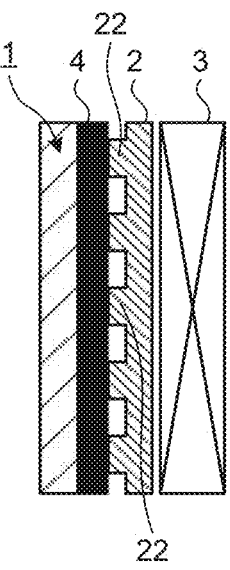
FIG. 14 is a cross-sectional view of an electric motor of an eleventh embodiment, in which a configuration of the electric motor is illustrated.

FIG. 14 is a cross-sectional view of an electric motor of an eleventh embodiment, in which a configuration of the electric motor is illustrated. FIG. 14 is a cross-sectional view taken along the axial direction of the central axis of the electric motor. The eleventh embodiment is a modification of the ninth embodiment illustrated in FIG. 12. In the ninth embodiment, the magnetic substance pressing portion 22 bent toward the outer periphery is provided at the end of each insulator 2. Meanwhile, in the eleventh embodiment, a plurality of the magnetic substance pressing portions 22 bent toward the outer periphery is intermittently provided along the direction of the central axis of the electric motor. Note that a configuration of the eleventh embodiment in which the plurality of magnetic substance pressing portions 22 is intermittently provided along the direction of the central axis of the electric motor may also be applied when a magnetic substance insertion groove for inserting the magnetic substance 4 is formed in the insulator 2 or when a magnetic substance insertion groove for inserting the magnetic substance 4 is formed in both the stator core 1 and the insulator 2.

As described above, according to the eleventh embodiment, since the plurality of magnetic substance pressing portions 22 is provided along the direction of the central axis of the electric motor, the magnetic substances 4 are uniformly pressed against the stator core 1 over the direction of the central axis of the electric motor.

Note that the first to eleventh embodiments described above can also be applied to a linear motor. A linear motor includes a stator and a movable element. The stator includes divided stator cores arranged in parallel. Each of the divided stator cores has a core back portion and a tooth portion extending to one side of the core back portion. A winding is wound around the tooth portion. The movable element is disposed on a coil side of the stator, and includes a magnet. Even in the case of application to a linear motor, a plurality of magnetic substances is provided such that each magnetic substance is disposed in such a way as to straddle joint portions of adjacent stator cores, and a plurality of grooves into which the plurality of magnetic substances is inserted is formed in the stator cores or insulators.

The configurations set forth in the above embodiments show examples of the subject matter of the present disclosure, and it is possible to combine the configurations with another known technique, and is also possible to partially omit or change the configurations without departing from the scope of the present disclosure.

REFERENCE SIGNS LIST

1 stator core; 1a stator core part; 1b core back portion; 1c tooth portion; 1d joint portion; 2 insulator; 3 coil; 4, 4a, 4b, 4c magnetic substance; 5 magnet; 6 shaft; 7, 7a, 7b, 7c, 7d, 7e magnetic substance insertion groove; Sa, 8b, 9a, 9b, 10a, 10b recess; 20, 21 magnetic substance stopper; 22, 23b magnetic substance pressing portion; 23 leaf spring; 23a elastic portion; 100 electric motor; 110 stator; 120 rotor.

The invention claimed is:

1. An electric motor stator comprising:

a stator core including a plurality of joined stator core parts each having a core back portion and a tooth portion protruding from the core back portion toward an inner peripheral side;

a plurality of insulators covering a plurality of the tooth portions;

coils wound around the tooth portions via the insulators; and a plurality of magnetic substances provided between inner peripheral ends of the core back portions and the insulators in such a way as to straddle the core back portions of the stator core parts that are adjacent, wherein the magnetic substance has a cross section in a letter V shape protruding toward an outer periphery, and extends in a direction of a central axis of the electric motor.

2. The electric motor stator according to claim 1, wherein grooves into which the magnetic substances are inserted are provided in the stator core.

3. The electric motor stator according to claim 1, wherein grooves into which the magnetic substances are inserted are provided in the stator core and the insulators.

4. The electric motor stator according to claim 1, wherein the magnetic substance extends in a direction of a central axis of the electric motor.

5. The electric motor stator according to claim 1, wherein a leaf spring is provided at an end of the insulator on a side on which the insulator is in contact with the magnetic substance, the leaf spring pressing the magnetic substance toward the core back portion by elasticity.

6. An electric motor comprising:

the electric motor stator according to claim 1; and a movable element provided in such a way as to face the stator.

7. An electric motor stator comprising:

a stator core including a plurality of joined stator core parts each having a core back portion and a tooth portion protruding from the core back portion toward an inner peripheral side;

a plurality of insulators covering a plurality of the tooth portions;

coils wound around the tooth portions via the insulators; and a plurality of magnetic substances provided between inner peripheral ends of the core back portions and the insulators in such a way as to straddle the core back portions of the stator core parts that are adjacent, wherein the magnetic substance has a box-shaped cross section in which both end portions are bent toward an outer periphery, and extends in a direction of a central axis of the electric motor.

8. The electric motor stator according to claim 7, wherein grooves into which the magnetic substances are inserted are provided in the stator core.

9. The electric motor stator according to claim 7, wherein grooves into which the magnetic substances are inserted are provided in the stator core and the insulators.

10. The electric motor stator according to claim 7, wherein the magnetic substance extends in a direction of a central axis of the electric motor.

11. The electric motor stator according to claim 7, wherein a leaf spring is provided at an end of the insulator on a side on which the insulator is in contact with the magnetic substance, the leaf spring pressing the magnetic substance toward the core back portion by elasticity.

12. An electric motor comprising:

the electric motor stator according to claim 1; and a movable element provided in such a way as to face the stator.

13. An electric motor stator comprising:

a stator core including a plurality of joined stator core parts each having a core back portion and a tooth portion protruding from the core back portion toward an inner peripheral side;

a plurality of insulators covering a plurality of the tooth portions;

coils wound around the tooth portions via the insulators; and a plurality of magnetic substances provided between inner peripheral ends of the core back portions and the insulators in such a way as to straddle the core back portions of the stator core parts that are adjacent, wherein the magnetic substance is shaped such that a central portion protrudes toward an outer periphery in cross section, and extends in a direction of a central axis of the electric motor.

14. The electric motor stator according to claim 13, wherein grooves into which the magnetic substances are inserted are provided in the stator core.

15. The electric motor stator according to claim 13, wherein grooves into which the magnetic substances are inserted are provided in the stator core and the insulators.

16. The electric motor stator according to claim 13, wherein the magnetic substance extends in a direction of a central axis of the electric motor.

17. The electric motor stator according to claim 13, wherein a leaf spring is provided at an end of the insulator on a side on which the insulator is in contact with the magnetic substance, the leaf spring pressing the magnetic substance toward the core back portion by elasticity.

18. An electric motor comprising:

the electric motor stator according to claim 13; and a movable element provided in such a way as to face the stator.

* * * * *